United States Patent [19]

Altenburger

[11] 3,718,907

[45] Feb. 27, 1973

[54] SCANNER CIRCUIT

[75] Inventor: Otto Altenburger, Rochester, N.Y.

[73] Assignee: Stromberg-Carlson Corporation, Rochester, N.Y.

[22] Filed: June 15, 1971

[21] Appl. No.: 153,234

[52] U.S. Cl. ............................340/147 R, 179/27 D

[51] Int. Cl. ..............................................H04q 3/00

[58] Field of Search ........340/147 R, 147 CN, 166 R; 179/18 E, 18 EB, 18 ET, 18 FH, 18 GF, 27 D, 27 DB

[56] References Cited

UNITED STATES PATENTS

| | | | |
|---|---|---|---|
| 3,334,191 | 8/1967 | Arseneau et al. | 179/27 D |
| 3,522,387 | 7/1970 | Schonemeyer et al. | 179/18 E |
| 3,601,546 | 8/1971 | Lee | 179/18 EB |

*Primary Examiner*—Donald J. Yusko
*Attorney*—Charles C. Krawczyk

[57] ABSTRACT

The scanner circuit includes a counter that provides sequential scanning pulses. In response to a current pulse, the counter circuit is stopped. The counter is enabled to start a preset number of scanning or counting cycles in a scanning sequence. Prior to the first scanning cycle, a memory circuit presets the counter. At the end of the first scanning cycle the counter presets the memory circuit. The arrangement is such that the first scanning cycle of each new scanning sequence begins at the count at which the counter stopped at the end of the first scanning cycle of the prior counting sequence. If no current pulse is detected when the counter reaches a preset count limt a preset number of times in one scanning cycle, the scanner circuit is reset.

15 Claims, 6 Drawing Figures

PATENTED FEB 27 1973

3,718,907

SHEET 1 OF 6

OTTO ALTENBURGER
INVENTOR.

BY Charles C. Krawczyk
ATTORNEY

OTTO ALTENBURGER
INVENTOR.

BY Charles C. Krawczyk

ATTORNEY

OTTO ALTENBURGER
INVENTORS

BY Charles C. Krawczyk

ATTORNEY

PATENTED FEB 27 1973 3,718,907

OTTO ALTENBURGER
INVENTORS

BY Clarence C. Kraus[?]

ATTORNEY

OTTO ALTENBURGER
INVENTORS

BY [signature]

ATTORNEY

OTTO ALTENBURGER
INVENTORS

BY [signature]
ATTORNEY

SCANNER CIRCUIT

BACKGROUND OF THE INVENTION

The invention pertains to scanner circuits in general, and more particularly, to scanner circuits for locating free paths through a telephone switching network.

Common control type telephone systems employ matrix switching networks for providing the various required circuit interconnections. The switching networks generally include multiple stages of matrix switches that are interconnected in a manner to provide plural paths between circuits connected to opposite ends of the networks. Some sort of path finding system is required to: first determine if a free path is available between the circuits to be connected; second to identify one of the free paths, and third to select only one of the free paths.

One of methods used in path finding is to mark one of the circuits at one end of the network and then to scan through the network in successive steps to identify the particular links in the network that are available. One example of such path finding system is disclosed in a U. S. Pat. No. 3,542,960, entitled "System for Selecting a Free Path Through a Multi-Stage Switching Matrix Having a Plurality of Paths Between Each Input and Each Output Thereof", filed on Oct. 12, 1967, for Gerhard O.K. Schneider wherein separate scanner circuits are connected to the link connections between stages and the scanner circuits are actuated in sequence to locate and select the free path. The use of separate scanner circuits in the path finding of the above mentioned patent provided an arrangement that has wide use in telephone systems and the like, however, the use of separate scanner circuits tends to be somewhat expensive. It would therefore be highly advantageous if a single scanner circuit could be provided that could function as the plurality of separate scanner circuits and that also could be switched into the network at desired locations to provide the scanning functions.

In the telephone systems of the type disclosed in the above mentioned patent, the systems generally include a plurality of networks, at least one service network for providing connections to register circuits and the like, and another network for establishing the circuit interconnections through the network once the register circuit has identified the parties to be interconnected. The size of the network depends upon traffic considerations. At times such networks are also separated into individual grids, each functioning as separate networks connected in parallel. Furthermore, the number of stages and circuits to be selected for interconnection changes with each system arrangement. For example, if a line circuit is to be connected to a register, the path finding system through the service network must first establish that there is a free path from one of a plurality of available registers to the line circuit requesting service. Once a free path has been detected (of which more than one is available) the path finding system is required to identify particular links in the network that form part of a free path, and also must select one of a plurality of free junctors to be included as a portion of the free path. The number of sequential scanning steps required in the path finding sequence is determined to a large extent by the number of stages in the service network. In general, the greater the number of stages in the network the larger the number of scanning steps required to isolate a free path. In service networks that are connected to trunk circuits, the trunk circuit is generally identified by the incoming call and therefore the number of scanning steps is less than in the service networks that connect the telephone lines to a register (there is no need to scan for a free trunk as in the case of the junctor circuit).

In addition to the foregoing, the network for completing the interconnections between telephones requires a number of scanning steps, the number of which also depends upon the number of stages in the network. In some cases, free ringing circuits are required to be selected during the path finding process. Furthermore, if no path is available through one grid of this network, reentry can be included for providing additional paths through other grids in the network and/or in the same grid. The reentry function requires additional scanning steps in the first scanning cycle to first determine if a normal path is available, and if no normal path is available, then to subsequently determine if a path is available through the reentry connection. It would therefore also be desirable if a single scanner arrangement could be provided to function with many types and sizes of service networks as well as many types and sizes of interconnecting networks, with and without reentry.

It is apparent from the above mentioned requirements, in order for any single scanner arrangement to be readily adaptable for use with a variety of networks, the scanner arrangement would be required to be easily modified to provide a variety of scanning cycles in a scanning sequence to conform with the size of the network, and also to have sufficient additional scanning cycles to select available circuits connected to the network, such as junctor circuits. In addition to the foregoing, the circuit must be able to recognize that a normal free path is not available and provide for a rescan of the same network stage in the reentry mode of operation to establish that a path is available through reentry.

An additional desirable feature for scanner circuits is to function as an allotter to provide a means by which traffic can be distributed through the network. For example, if no allotting arrangement was provided and the first scan begins at zero, then the first group of registers, or the first group of matrix switch modules, are scanned first and selected for connection. Hence, the equipment associated with the higher scan numbers would not be selected except during high traffic periods. As a result, the most of the wear will result in the equipment associated with the lower scan numbers while the equipment associated with higher scan numbers will have minimum use and wear. It would therefore be highly desirable if such scanner system was provided with means for allotting the traffic through the various networks in a uniform manner.

It is therefore an object of this invention to provide a new and improved scanner circuit.

It is also an object of this invention to provide a new and improved scanner circuit that can be sequentially switched into various portions of a network to provide scanning signals for path finding.

It is also an object of this invention to provide a new and improved scanner circuit that is readily adjustable for providing any number of scanning cycles in a scan sequence.

It is still a further object of the invention to provide a new and improved scanner circuit that detects when a free path through a network is not available and provides an additional scanning cycle for use in reentry.

It is also an object of this invention to provide a new and improved scanning circuit that functions as an allotter circuit to distribute traffic through a network.

BRIEF DESCRIPTION OF THE INVENTION

Counter circuit means receiving counting pulses produces sequential scanning pulses. Circuit means are provided for stopping the counter circuit in response to a circuit condition, such as a current pulse, caused by any one of the scanning pulses. Further circuit means are provided for enabling the counter circuit means to start a preset number of successive scanning or counting cycles in a scanning sequence.

In accordance with one feature of the invention, the counter circuit means is connected to a memory circuit so that the count in the memory circuit is applied to the counter circuit means prior to the start of the first scanning cycle in the scanning sequence. The counter circuit means is also connected to the memory circuit for applying a count to the memory circuit at the end of the first scanning cycle. Hence, the scanner circuit functions as an allotter to start the first scanning cycle at the count corresponding to the count at the end of the first scanning cycle of the prior scanning sequence.

A still further feature of the invention includes a first output circuit for producing an output signal on one of a first plurality of output lines corresponding to the count in the counter circuit at the end of each of a plurality of scanning cycles of the scanning sequence including the first scanning cycle. A second output circuit produces an output signal on one of a second plurality of output lines corresponding to the count in the counter circuit means at the end of at least the last scanning cycle of the scanning sequence.

Another feature of the invention includes means for detecting the number of times the counter circuit means in a given scanning cycle has reached a preset count and to produce a no path available signal, or a reentry signal, when the preset count has been reached a predetermined number of times. Each time the counter reaches the preset count it is reset. Additional circuit means are included to provide a second output signal when the present count has been reached an additional time to indicate no path is available through reentry.

DESCRIPTION OF THE PREFERRED EMBODIMENT

Figure 1:
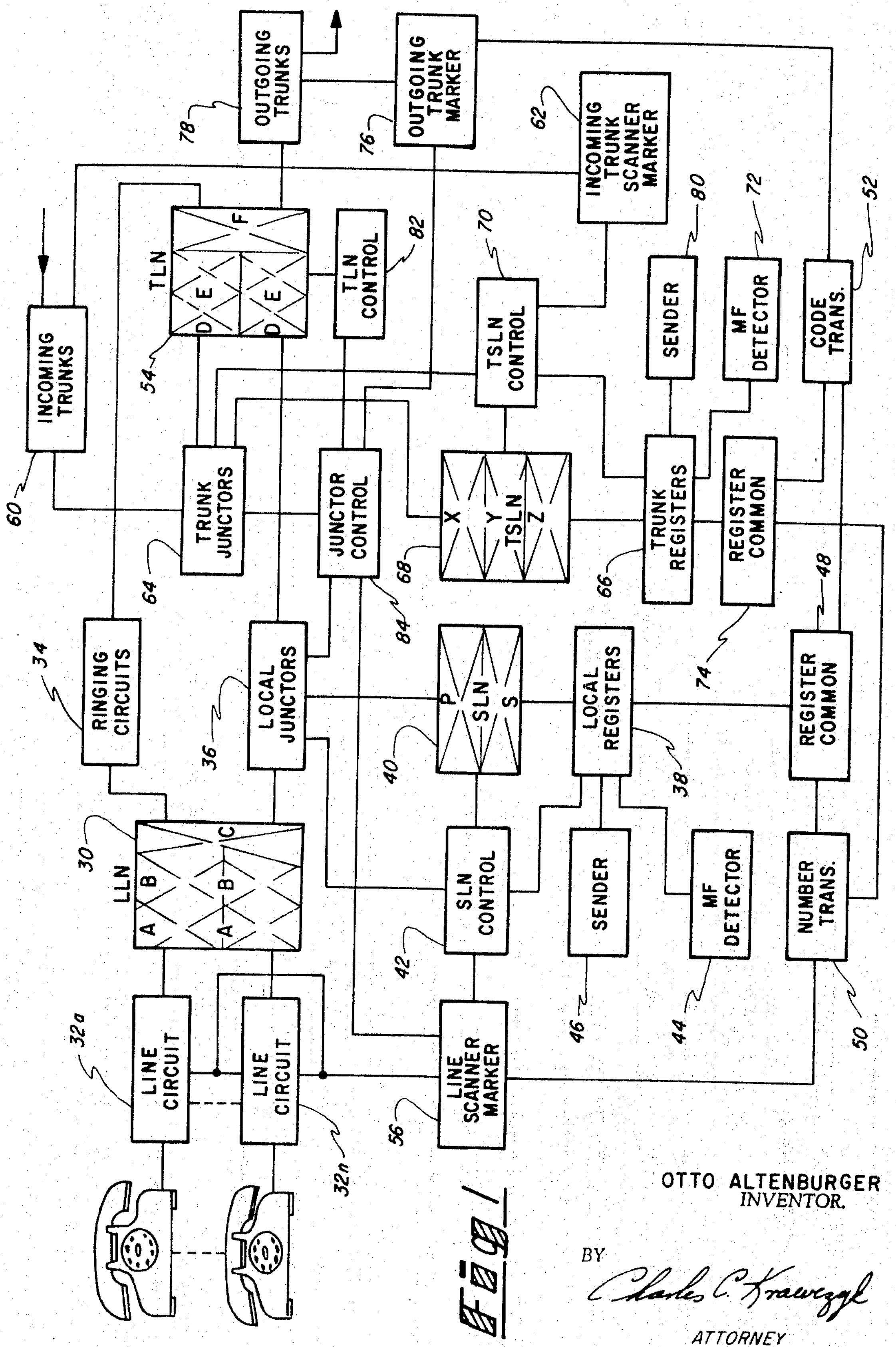
FIG. 1 is a block diagram of an example of a telephone system that is adapted to use the scanner circuit of the invention.

The switching system of FIG. 1 includes a line link network (LLN) 30 which functions as a concentrator for originating line calls and a fan-out for terminating calls. The LLN consists of three stages of matrices, A, B and C, and is used for both originating and terminating types of traffic. The LLN 30 is connected at one end to a plurality of line circuits **32*a*–32*n***, which vary in number depending upon the telephone service to be offered. The line link network provides one unique path between circuits connected to opposite ends of the network. Each of the switching networks in FIG. 1 include matrix switches comprised of relays including a mark or control winding for initially actuating the relay and a hold or sleeve coil connected in series with its own contacts for maintaining the relay actuated after a path through the network has been established.

The C stage of the LLN provides the termination for both originating traffic from the line circuits **32*a*–32*n* and incoming traffic to the line circuits. These terminations of the LLN are connected to the local junctors 36 for originating traffic and the ringing controls 34 for terminating traffic. The number of local junctors and ringing controls provided depends upon the traffic requirements for the system. The ringing controls are more fully described in a copending patent application, Ser. No. 100,647, filed on Dec. 22, 1970, and entitled "Ringing Control Circuit", in the name of Otto Altenburger and is assigned to the assignee of the present application. The junctor circuit 38 and its control (junctor control 84**) is more fully described in a copending patent application, Ser. No. 100,571, filed on Dec. 22, 1970, and entitled "Junctor and Junctor Control", in the name of Otto Altenburger and is assigned to the assignee of the present application.

The local junctors 36 serve as the focal points for all originating type traffic. The local junctors include provisions for connecting the line circuits to the local registers 38 via a service link network (SLN) 40, and for providing transmission battery for calling and called parties on intraoffice calls. The local junctors 36 are under the control of the calling party. When trunk or station busy conditions are encountered, the local junctors 36 provide the busy tone to the calling party.

The service link network 40 includes two stages of matrices (P and S) and is controlled by a SLN control circuit 42 for connecting the calling line circuit **30*a*–30 (via one of the local junctors 36) to one of a plurality of local registers 38. The local registers 38, when connected to the local junctors 36, provide dial tone and include apparatus for acting on the subscriber instructions. The local junctors 36 terminate on the P stage and the dial pulse acceptors in the local registers terminate at the S stage. The dial pulse acceptors function as an interface between the local junctors 36 and the local registers 38. The dial pulse acceptor (DPA) provide the dial tone to the calling subscriber and also detect rotary dial pulses and extend the pulses to storage sections in the local registers. In the event of multifrequency signalling by the subscriber, the frequencies are detected by MF detectors 44 connected to the dial pulse acceptors. The local registers 38 consist of a DPA, register storage and register output and are connected to a sender 46** for providing outpulsing. The registers and senders are controlled by a register common 48 which contains the necessary control units. The local registers 38 are connected to the register common control 48 on a time division multiplex basis wherein information is passed from one equipment to another on a common buss basis. The register common control 48 is also connected to communicate with a number translator 50 and a code translator 52 on a time division multiplex basis. The translation circuits provide information such as equipment number, ringing codes and class of service. The number translator 50 is connected to the line scanner-marker circuit 56 which has the means to detect service request and means to access the individual circuits 32*a*–32.

The ringing controls 34 connect ringing generators to terminating or called stations, detect off hook conditions (ring-trip) of the called station, and provide ringback tone for the calling station. Each line circuit can be connected to any of a plurality of ringing controls which are accessed from a trunk link network (TLN) 54 so that a ringing control is automatically connected to the terminating line circuit as soon as a connection to that line is complete.

A line scanner circuit 56 continuously checks the line circuits 32*a*–32*n* for an off hook condition. The line circuits are more fully described in a copending patent application, Ser. No. 153,233, entitled "Plug-in Line Circuit Arrangement", filed on June 15, 1971, for Otto Altenburger. The line scanner circuit 56 is used for both originating and terminating types of traffic. In the event of originating traffic, the line scanner stops when an off hook condition is detected and transmits the information from its counter circuits to a line marker circuit to mark the particular line circuit 32*a*–32 and enables the SLN control 42 to initiate a path finding operation between an available local register and the line circuit requesting service. In the event of terminating traffic, the line scanner is controlled by the number translator, wherein the line scanner receives an equipment number from the number translator to mark the line circuit 32*a*–32*n* with the particular equipment location. Furthermore, in terminating traffic, the line marker is also involved in transmitting the terminating subscriber classes of service, ringing code, busy or idle status, and types of ringing required through the junctor control 84 to the ringing control 34. The line scanner-marker circuit 56 is more fully described in a copending patent application, Ser. No. 101,091, filed on Dec. 23, 1970, entitled "Line Scanner and Marker", in the names of Gunter F. Neumeier and Otto Altenburger and is assigned to the assignee of the present application.

In operation, when a telephone goes off hook, the line scanner marker 56 detects the off hook condition and marks the line circuit connection to the A stage of the LLN 30. Simultaneously, the line scanner marker circuit 56 signals the SLN control 42 to begin its path finding process for connecting the marked line circuit to one of the local registers 38. The SLN control 42 includes the scanner system of the invention. The SLN control detects and locates a path in a three step scanning process. The first scan locates the existence of a free path from a free local register to the line circuit, and identifies the free local registers 38 and its corresponding stage S matrix module. The second scan identifies a free path through a P stage matrix module. The third scan identifies a free local junctor. The connection of the local junctor to the LLN 30 and the connection to the SLN 40 are now marked. When path finding is complete, the selected matrix relay coils in the LLN and the SLN are energized. The metallic connections through the tip and ring leads are checked. If the connection is complete, the sleeve coil connections are completed, and the connected local junctor 36 is seized. At this time, the SLN control 42 line scanner-marker circuit 56 is released, and the local register 38 is connected to the subscriber to receive dial information. Once the subscriber information has been dialed into a local register 38, the call must be routed either internally to another local subscriber, or externally to another exchange.

Incoming calls from other exchanges are applied to one of a plurality of incoming trunk circuits 60. An incoming trunk scan circuit 62 continuously scans the incoming trunks 60 looking for a seized incoming trunk circuit. When a seized incoming trunk circuit is located, a scanner circuit stops and transmits the trunk equipment number to a marker circuit, identifying the particular incoming trunk. The identified incoming trunk circuit is also connected to a trunk junctor 64 which is essentially identical to the local junctor 36, but is connected between the incoming trunk 60 and the TLN network 54 and a trunk service line network 68. The trunk junctor 64 functions as a focal point of all incoming type traffic and includes provisions for connecting the incoming trunk to any one of a plurality of trunk registers 66 via the trunk service line network (TSLN) 68. The trunk junctors 64 also provide incoming and called party with transmission battery, and when encountering either trunk or station busy conditions, returns a busy tone to the incoming call.

The TSLN control 70 functions to locate a path between the trunk junctors 64 and the trunk registers 66 and also includes the scanning system of the invention. The trunk junctors 64 are terminated on the stage X matrix module of the TSLN 68 while the trunk registers 66 are terminated at the Z stage matrix modules. The TSLN 68 is divided into a number of separate grids. The incoming trunk scanner-marker circuit 62 signals the TSLN control 70 which of the grids will be used for accessing one of the trunk registers 66 as determined by the trunk junctor 64 involved in the connection. The trunk registers 66 include a dial pulse acceptor interface and subcircuits including register storage and register output. A multifrequency detector 72 is also connected to the trunk registers. The subcircuits and the multifrequency detector 72 are controlled by a register common control 74 on a time division multiplex basis. The register common is connected to communicate with the number translator 50 and the code translator 52 on a time division basis. The code translator is connected to the outgoing trunk marker circuit 76 to identify outgoing trunk groups 78. The outgoing trunk marker 76 forms the subject matter of a copending patent application, Ser. No. 103,267, filed on Dec. 31, 1970, entitled "Outgoing Trunk Marker", in the names of Otto Altenburger and David W. Stoddard and is assigned to the assignee of the present application. A sender circuit 80 is also connected to the trunk registers 66 to provide outgoing pulsing.

Since the trunk junctors 64 are identified by the incoming trunk marker circuit 62, only a two step scan is required in the path finding scheme of the TSLN control 70. In the first scan, a free path is detected between a free trunk register 66 and the seized trunk junctor 64 and the free trunk register is identified and marked, and the connected Z stage module is identified. The next scan locates a free path through the X and Y stage matrix modules to the marked trunk junctors 64 and energizes the mark relay coils through the Y and Z matrix modules and also energizes the mark relay coils through the Z stage matrix modules to the marked trunk register. When the connection between the trunk junctors 64 and the trunk registers 66 is completed, the metallic connections through the tip and ring leads are checked and then the sleeve connections are completed. The TSLN control and the incoming trunk marker 62 are now released. Once the incoming information has been received by one of the trunk registers 66, the call is either routed internally to a local subscriber, or externally to other exchanges via the outgoing trunk 78.

The TLN 54 provides for the termination of the local traffic to the local subscribers, the termination of incoming calls from other exchanges to the local subscribers, and for the connection of incoming calls from other exchanges to other external exchanges. The TLN 54 includes D and E stage matrices. When further expansion is necessary, an F stage matrix is included as illustrated. The D stage is the entrance to the TLN and is connected to the local junctors 36 and to the trunk junctors 64. The F stage is the exit of the TLN network and is connected via the ringing controls 34 to the LLN 30 and also to the outgoing trunks 78.

The path finding through the TLN 54 is under the control of the TLN control 82 and the junctor control 84. The TLN control 82 also includes the scanner system of the invention. The TLN control 82 and the junctor control 84 work together in completing the termination portion of a call, whether it is an internally terminated call, or an outgoing call to a distant office. The number translator 50 and line scanner-marker 56 are used to complete calls to local lines, and the code translator 52, together with the outgoing trunk marker 76 complete calls to trunks. The path finding scheme of the TLN control 82 includes a two step scan. The local junctor 36, or the trunk junctor 64, have been previously marked (depending upon whether its an incoming call or locally generated call). Furthermore, the information in the local or trunk registers is transmitted from the registers via the register common 48 or 74 to either the number translator 50 or the code translator 52, depending upon whether it is a call terminating to a local subscriber, or a call going to a distant exchange, respectively. In the event of a call terminating to a local subscriber, the number translator 50 via the line scanner-marker circuit 56 marks the line circuit of the terminating call. In the event of an outgoing call, the code translator 52 via the outgoing trunk marker circuit 76 marks the particular outgoing trunk group 78.

The first scan of the TLN control detects a free path through the TLN 54 to either the marked outgoing trunk 78, or via the LLN 30 to a line circuit **32*a*–32*n***, and identifies the stage E module (the stage D module was identified by the seized local or trunk junctor). The next scan identifies and marks the input to the stage F module. The second scan also completes the connections back through the D and E modules to the marked junctor by energizing the matrix mark relay coils and also provides power through the F stage and the LLN to energize the mark relay coils. After a metallic path check is made via the tip and ring leads, the sleeve connections are picked up to complete the connection through the TLN.

The ringing control 34 now rings the called party. The connections through the LLN 30 and the TLN 54 and the local or trunk junctors 36 or 64 are maintained during the call under the control of the calling party. When the calling party hangs up, all the connections are broken. In the event the calling party still remains off hook after the called party hangs up, provisions are included in the junctor circuits so that the connections are broken after a preset period of time.

Figure 2:
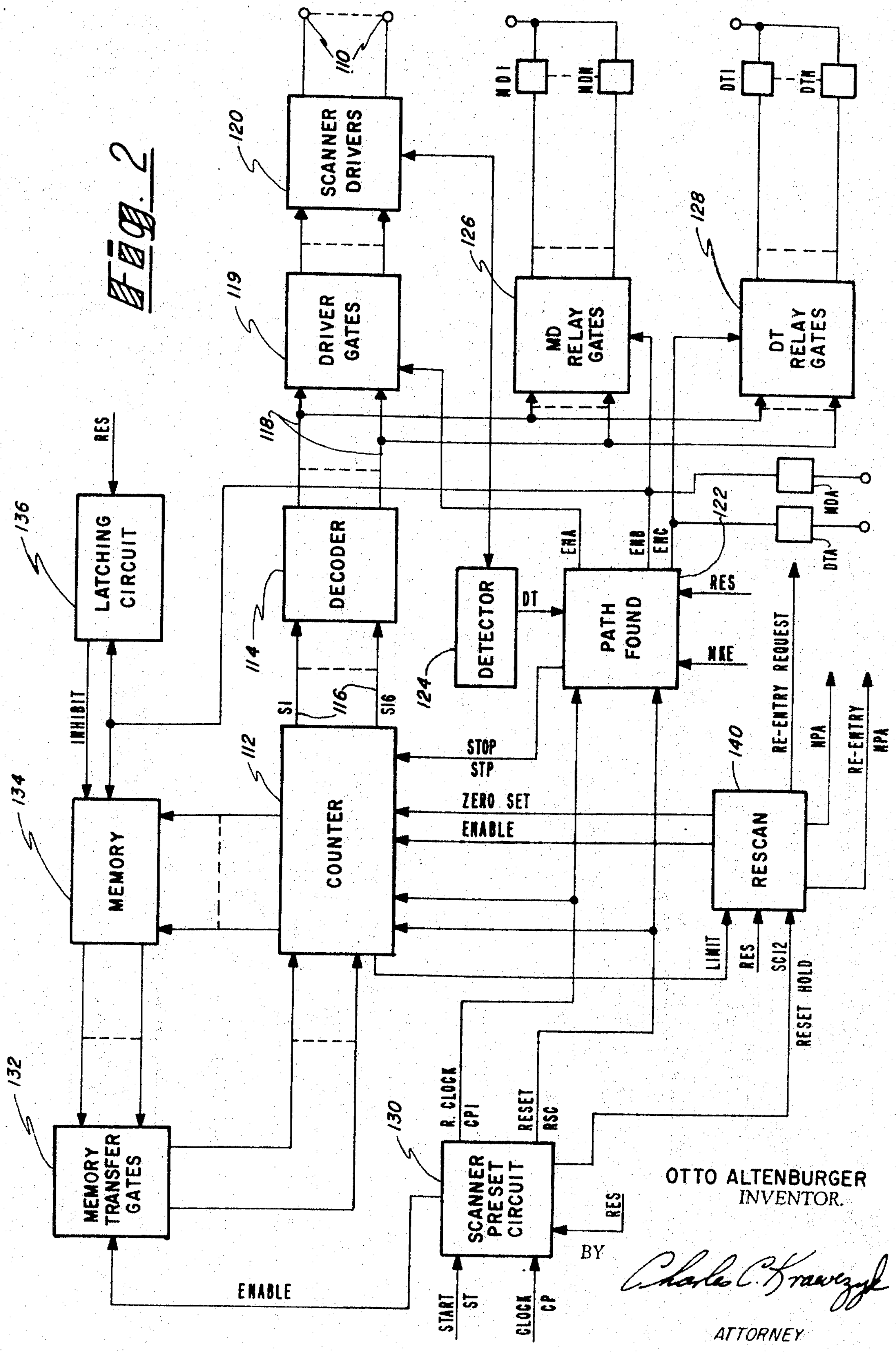
FIG. 2 is a block diagram of the scanner circuit of the invention.

FIG. 2 includes a block diagram of the scanning system of the invention for providing sequential scanning pulses in consecutive order on a plurality of output terminals 110 that are adapted to be connected as a portion of a path finding system for locating free paths through a telephone switching network of FIG. 1 (SLN, TSLN and TLN) and also to function as an allotter arrangement wherein the first scan of a multiple scan sequence is controlled to start at the same scan position as left off during the first scan of the prior scanning sequence. The scanning system includes a counter circuit 112, such as a binary counter, providing counting signals via the lines 116 to a decoder circuit 114, such as a binary-to-decimal decoder. The decoder circuit 114 converts the counting signals into sequential pulses appearing in consecutive order at the decoder output lines 118. The binary counter and decoder circuits are well known in the art and therefore do not require any further explanation.

The sequential pulses at the output lines 118 are individually applied via a plurality of driver gates 119 to sequentially activate individual ones of a plurality of driver circuits 120 in response to a gating signal ENA to provide scanning signals, such as ground pulses, in consecutive order at the output terminals 110. The output terminals 110 are adapted to be connected to provide scanning pulses for path finding purposes in a manner as described in a copending patent application, Ser. No. 153,221, entitled "Path Finding System", filed on June 15, 1971, for Otto Altenburger, and assigned to the assignee of the present application. During scanning, the driver gates 119 are periodically enabled by a signal ENA from a path found circuit 122 to synchronize the appearance of the scanning pulses on the output terminals 110 with the counting pulses applied to the counter circuit 112.

A detector circuit 124 is connected to each of the scanner drivers 120 to detect the presence of a current pulse through any of the scanner circuits indicating that a scanning pulse has been applied via a free path to a marked circuit. In response to the current pulse, the detector circuit 124 applies a signal DT to a path found circuit 122 indicating that a free path has been found. The path found circuit 122, in turn, removes the ENA pulses from the driver gates 119 and also applies a stop signal STP to the counter circuit 112.

At the end of the first scan of a multiple scan sequence, and in response to the signal DT, the path found circuit 122 applies a signal ENB to enable the MD relay gate circuits 126. The MD relay gate circuit 126 includes a plurality of gates wherein individual ones of the gates are connected between separate ones of the decoder output lines 118 and separate ones of the relay MD1–MDN so that one of the relays, corresponding to the free path, is activated. During each scan of a multiple scan sequence, the path found circuit 122 is enabled to provide the ENA pulses to the driver circuits 120 so that the scanner drivers 120 are enabled for each scan of the multiple scanning sequence. If more than two scans are to be provided in the multiple scan sequence, the signal ENB is generated at the end of all scans, except for the last scan. After the next to the last scan has been completed, a signal MKE IS applied to the path found circuit 122 from system common control, so that a signal EMC is applied to the DT relay gates 128 when a current pulse is detected. The DT relay gates include a plurality of gates wherein individual ones of the gates are connected between separate ones of the output lines 118 and separate ones of the relays DT1–DTN so that one of the relays are energized depending upon the scanning signal generating the current pulse.

Hence, in accordance with the scanning system of the invention, the scanning pulses for a multiple scan sequence are provided for each scan at the output terminals 110. When a current pulse is detected during the first scan, and all subsequent scans other than the last scan, a signal ENB is generated and applied to the MD relay gate circuit 126 to operate a corresponding one of the relays MD1–MDN. During the last scan sequence, an ENC signal generated in response to the detection of a current pulse is applied to the DT relay gate circuit 128 to operate one of the DT1–DTN relays corresponding to the scanning signal providing the current pulse.

The first scan of the scanning system is started by a start signal ST applied to a scanner preset circuit 130. Clock pulses CP are also applied to the preset scanner circuit 130. In response to the start signal ST, an enable signal RSC is applied to the counter circuit 112 to enable the circuit to count reduced clock pulses CP1 from the scanner preset circuit 130. Reduced clock pulses CP1 are also applied to the path found circuit 122 to provide the timing required for the ENA pulses. A reset signal RSC is also applied to the path found circuit to reset the circuit and remove any stop signal STP from the counter circuit 112. The scanner preset circuit 130 also applies an enable signal to the memory transfer gates 132 to transfer the count in a memory circuit or storage counter circuit 134 to the counter circuit 112 to start the counter (for the first scan) at the count preset in the memory 134. This allows the counter 112 to be preset at the start of each new scanning sequence to a count corresponding to the count previously reached in detecting a free path in the first scan of the prior path finding sequence and recorded in the memory circuit 134. This transfer of counts from the memory 134 through the counter 112 allows the scanning system to function as an allotter wherein the first scan of each sequence starts off at the point it had left off at in the prior sequence and thereby allows the distribution of traffic through a network being scanned, rather than concentrating the traffic on the first group of circuits. After the count has been transferred, the enable signal applied to the memory transfer gates 132 is removed to prevent any further transfer of counts from the memory circuit 134 to the counter 112 until after the path finding sequence is complete and a final reset signal RES is applied from the common control to the scanner system.

Hence, the counter circuit 112 starts counting at the count transfer therein and continues to provide the scanning pulses until stopped by the detection of a current pulse by the detector circuit 124, or until a preset limit count has been reached. If a current pulse has been detected, one of the MD relays will be actuated. The ENB signal is also applied to the memory circuit 134 to enable the memory circuit to receive the counts at which the counter 112 stopped at the end of the first scan, to store this count for presetting the first scan of the next subsequent path finding sequence. The ENB signal is also applied to a latching circuit 136 which is switched to a latched condition to inhibit the memory from receiving any further counts from the counter circuit 112 until the next path finding sequence.

In response to the actuation of a MD relay, the common control will apply another start signal ST to the preset circuit 130. In response to the signal ST, the preset circuit applies a count reset signal RSC to the counter circuit 112 to reset the counter to a count of zero and will also apply the reset signal RSC to the path found circuit 122 to remove the stop signal STP wherein the counter circuit 112 will again commence counting to provide scanning pulses at the output terminal 110. When a current pulse is detected by the detector circuit 124, an ENB signal is generated to allow the actuation of a MD relay for the second time if more than two scanning steps in a scanning sequence are required. In the event of a two scan sequence, or the last scan of the multiple scanning sequence, a signal MKE is applied to the path found circuit 122 to designate the last scan. When a current pulse is detected during the last scan, the path found circuit stops the scanner 112 and produces a signal ENC. The signal ENC enables the DT relay gates 128 so that one of the DT relays is enabled. The path finding sequence is not complete and an RES signal is applied to the various circuits in the scanner system to reset the scanner system for the next path finding sequence.

If during the first scan of the path finding sequence a free path has not been located while scanning from the count inserted into the connector 112 from the memory 134 to the count limit of the counter circuit 112, a limit signal is applied to a rescan circuit 140. The rescan circuit 140 records the limit condition and applies a zero set signal to the counter to reset the counter to a count of zero and then supplies a rescan enable signal to allow the counter to resume counting. If a current pulse is detected during this scan, the counter will be stopped and one of the MD relays are actuated, as previously described. If the counter reaches the counting limit again, the limit signal will be reapplied to the rescan circuit 140. If no reentry provisions are provided in the telephone network being scanned, the rescan signal will generate a no path available signal NPA. If a reentry scan function is to be provided, the rescan circuit 140 recognizes that the second count limit during the first scan has been reached and generates a reentry request signal. After the system reentry circuits have been enabled, the common control applies the start signal ST to the preset circuit 30 to restart the path finding sequence, and the counter is reset to zero by the rescan circuit 140. The counter circuit is again enabled by the rescan circuit to provide a reentry counting cycle. If a current pulse is detected during the reentry counting cycle, the counter 112 is stopped and one of the MD relays are enabled as previously described. If the counter 112 reaches its counting limit for the third time, the rescan circuit 140 generates a signal indicating no path available in the reentry scan.

Figure 3:
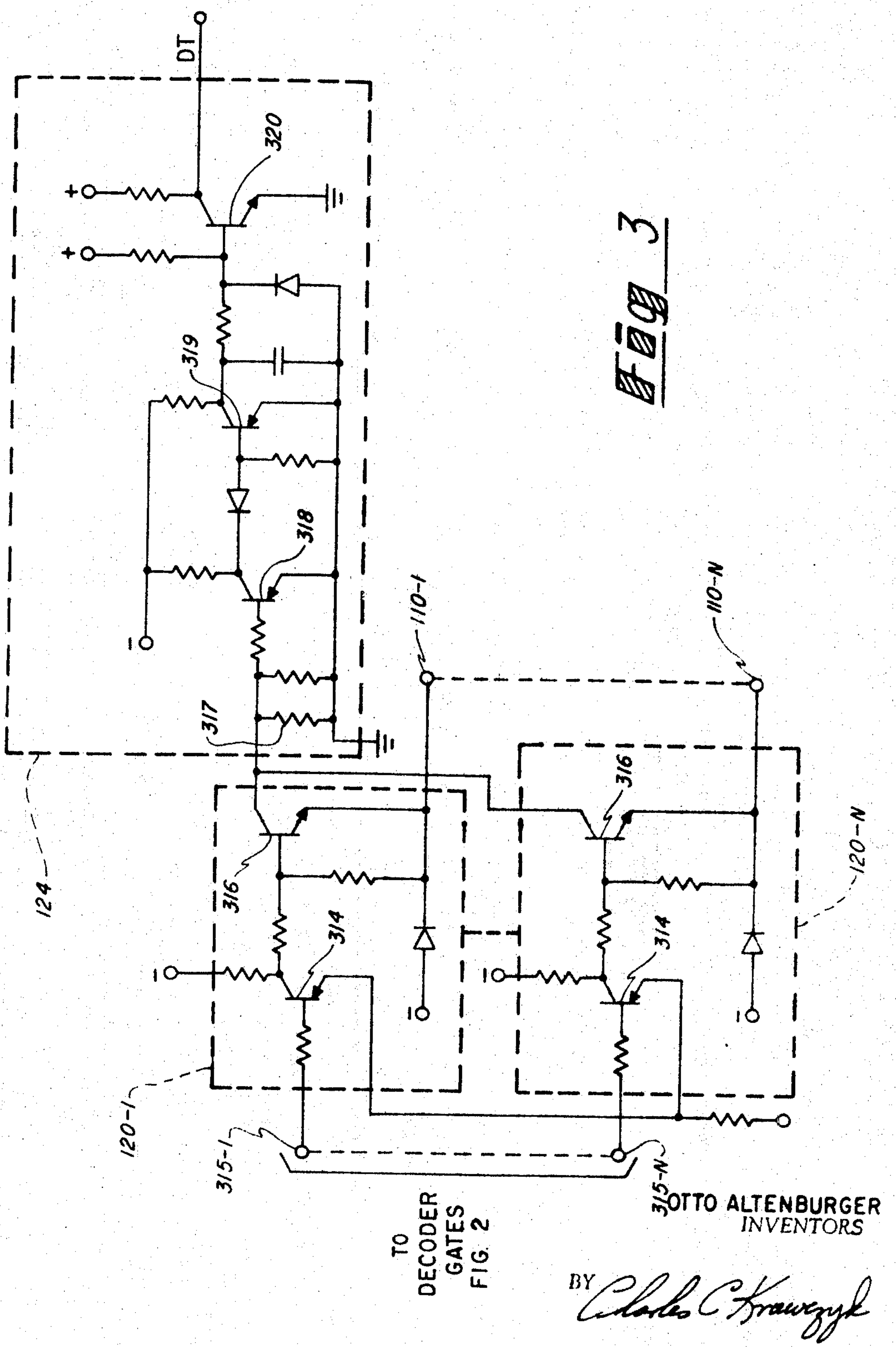
FIG. 3 is a schematic diagram of the detector circuit of FIG. 2.
Figure 4:
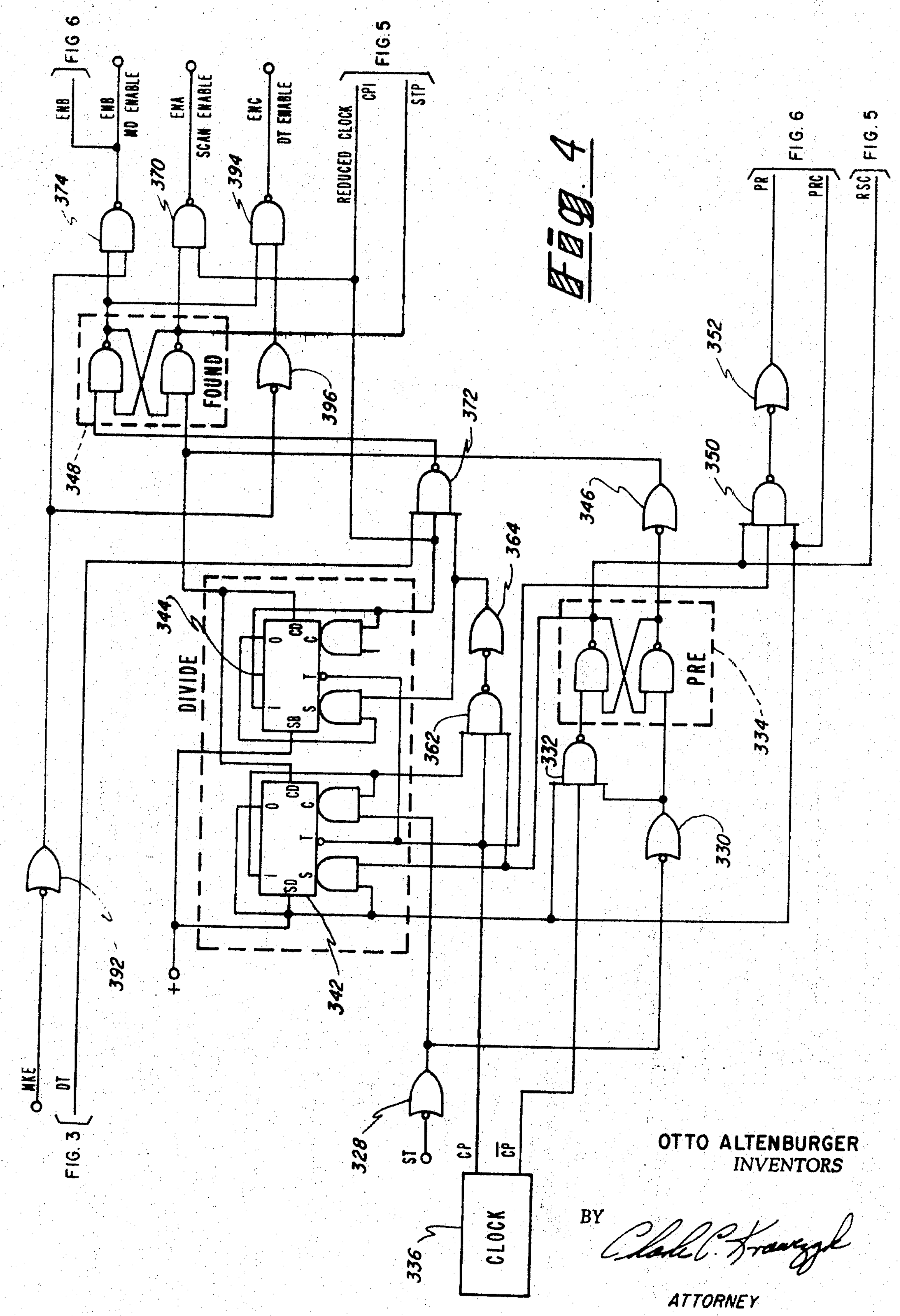
FIGS. 4–6 include a schematic diagram of the scanner circuit of the invention other than the detector circuit.
Figure 5:
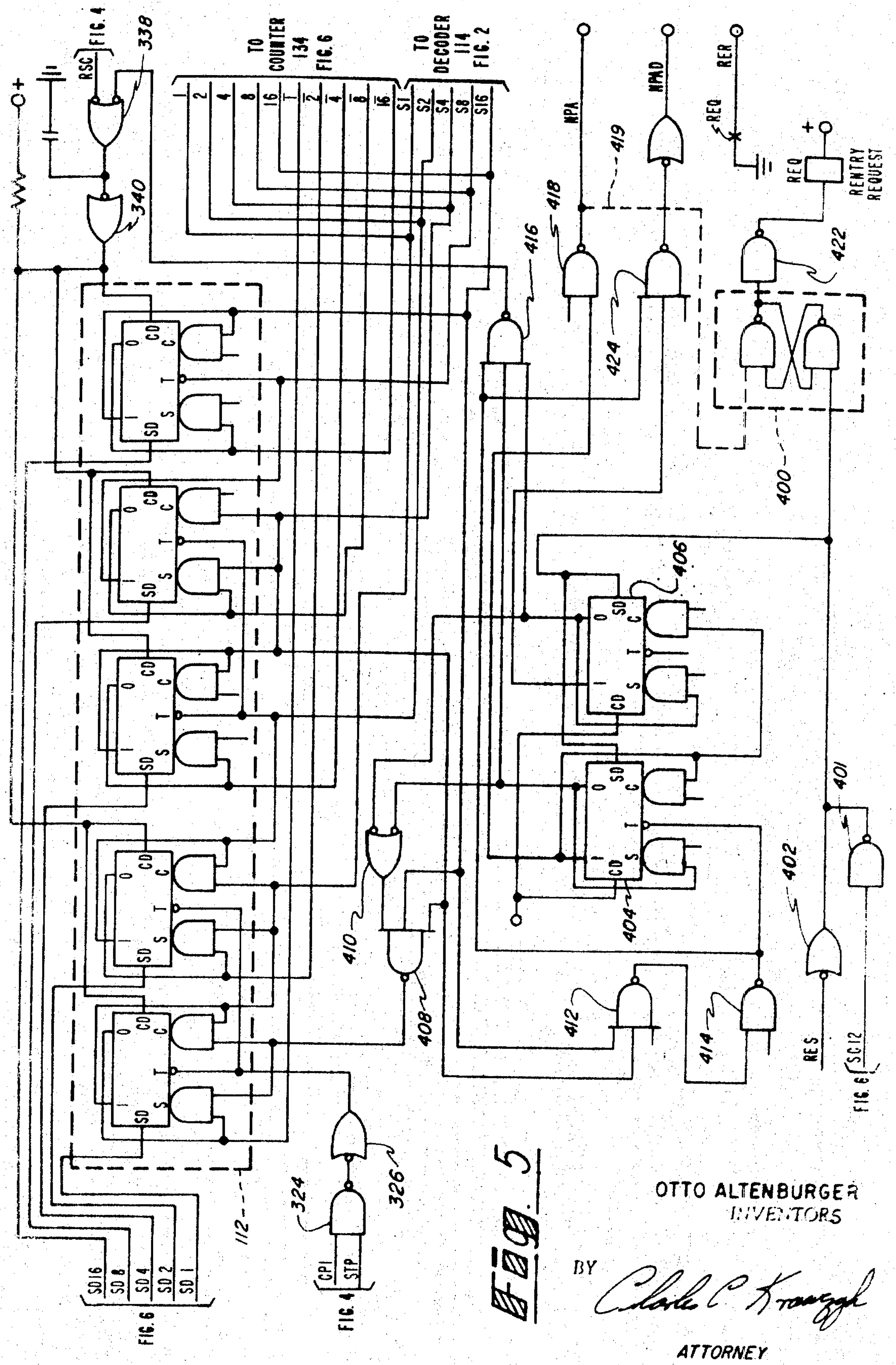

The scanner system of the invention will now be more fully explained with regards to FIGS. 3, 4 and 5. The driver circuits 120 and current detector 124 are schematically illustrated in FIG. 3. Each driver circuit 120–1 through 120–N includes a pair of transistors 314 and 316 connected in a direct current switching circuit that is responsive to a signal on the terminals 315–1 through 315–N from the decoder circuit 114 to apply a ground signal to the output terminals 110–1 through 110–N via a resistor 317 in the current detector circuit 124. The current detector circuit 124 includes an amplifier stage, including three direct coupled transistors 318, 319 and 320, that produces a path found signal DT in response to a current flow through the resistor 317.

Figure 6:
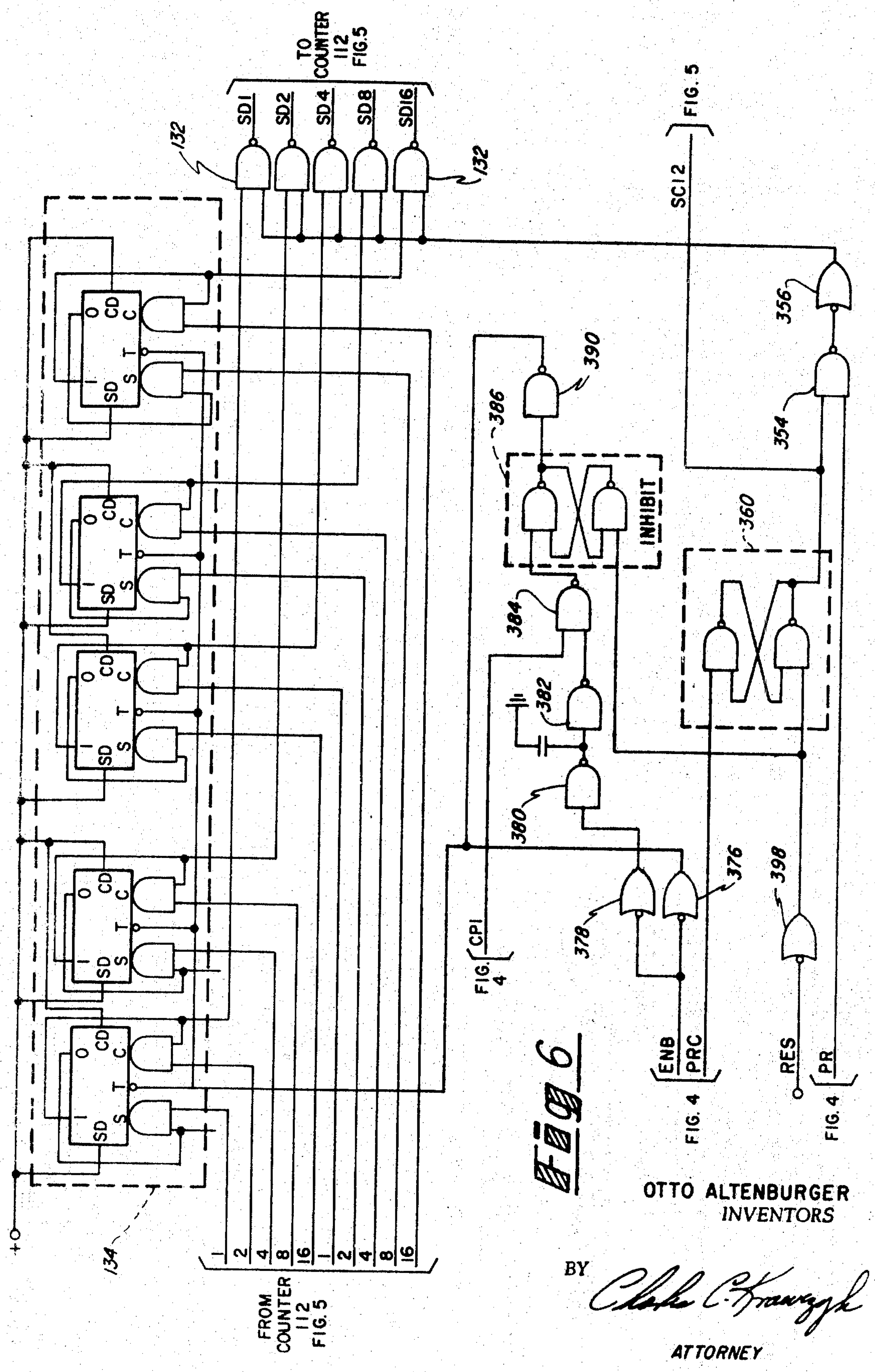

The counter circuit 112 (FIG. 5) and the memory or storage counter circuit 134 (FIG. 6) each including five flip-flop circuits arranged as a binary counting circuit. The counter circuit 112 counts the clock pulses received from the terminals CPI through the gates 324 and 326, and transmits the count to the decoder circuit 134 via lines S1 through S16. At the beginning of a path finding sequence, the storage counter 134 includes a count corresponding to that accumulated in the scanner counter 112 at the end of the first scan in the previous completed path finding sequence.

At the start of a scanning sequence, an ST signal (FIG. 4) is applied from one of the common control circuits (SLN control, TSLN control or TLN control) to an inverter circuit 328. The output from the inverter circuit 328 is transmitted through an inverter 330 and a gate 332 to "set" a pre flip-flop 334 during the presence of a $\overline{CP}$ signal from a clock circuit 336. The flip-flop 334 when set: (1) enables the counter 112 via the line RSC and gates 338 and 340, (2) enables the flip-flop circuits 342 and 344 via the inverter 346, and (3) resets a found flip-flop 348 via the gate 346. During the next clock pulse CP, the gates 350 and 352 apply a preset scanner signal PR through the gates 354 and 356 (FIG. 6) which, in turn, partially enable a plurality of memory transfer gates 132. The second input to gates 132 are connected to the various flip-flop stages in the storage counter 134. The output of the gates 132 are connected to the set inputs of the scanner counter 112 so that the preset count in the storage counter 134 is transferred into the scanner counter 112. This allows the scanner counter 112 to preset at the start of each new scanning sequence to a count corresponding to the count previously reached in the first scan of the prior path finding sequence wherein the arrangement functions as an allotter to distribute the traffic through the network rather than concentrating on the first group of matrix links or registers.

The trailing edge of the clock pulse CP sets the flip-flop 342, which, in turn, applies a signal on the lead PRC. The PRC signal sets a flip-flop 360 (FIG. 6) which, in turn, disables the gate 354 and prevents any further transfer of the counts from the storage counter 134 to the scanner counter 112 until the path finding sequence is complete and a final reset signal RES (from the SLN or TSLN or TLN control) is applied to reset the flip-flop 360. The flip-flops 334 and 342 (FIG. 4) also function to allow the clock pulses CP to be applied to divide the flip-flop 344 via the gates 362 and 364 so that the flip-flop 344 functions as a two-to-one count divider and produces the reduced clock pulses CP1 for driving the counter 112. With the found flip-flop 348 in the "reset" state, the gate 370 is enabled to develop an output signal ENA having a repetition rate corresponding to the reduced clock pulses from the flip-flop 344. The ENA signal is applied to the scanner drivers 120 (FIG. 2) to enable the driver circuits 120 in synchronism with the reduced clock rate. As previously mentioned, the outputs S1–S16 from the scanner counter 112 are also applied to the driver gates 119 via the decoder circuit 114 to produce the sequential scanning outputs from the scanner drivers 120.

The clock pulses are applied to the scanner counter 112 until a current pulse indicating a free path has been detected, at which time a DT signal is applied via a gate 372 to "set" the found flip-flop 348. When the flip-flop 348 is "set", the NAND gate 370 is disabled, a STP is applied to the gate 324 (FIG. 5) to prevent further clock pulses CPI from being applied to the scanner counter 112, and a gate 374 is enabled to develop the signal ENB, which, in turn, enables the MD relay gates 126 (FIG. 2) to energize one of the MD1–MDN relays corresponding to the count at which the scanner counter 112 stopped (and corresponding to the free path).

The ENB signal is also applied to the storage counter 134 via gate 376 so that the count in the scanner counter 112 at the end of the first scan is transferred to the storage counter 134 via the lines 1–16 and $\overline{1}$–$\overline{16}$. The ENB signal is also applied via a gate 378 to a latching type circuit including the gates 380, 382 and 384 and an inhibit flip-flop 386 that prevents any further transfer of counts to the scanner counter 112 until after the path finding sequence is complete and a general reset signal RES has been received to "reset" the inhibit flip-flop 386. The ENB signal is transmitted through the gates 380 and 382 to provide a short time delay and during the presence of the next clock pulse at terminal CP1 a signal is transmitted through the gate 384 to "set" the flip-flop 386. When the flip-flop 386 is set, a signal is transmitted through the gate 390 that inhibits any further transfer of data to the storage counter 134 for the remainder of the same path finding sequence. When the MDA relay of FIG. 2 is actuated in response to the ENB signal, the start signal ST is removed and the flip-flop 334 (FIG. 4) is "reset", which, in turn, resets the found flip-flop 348 via gate 346.

As previously mentioned with regards to FIG. 1, the SLN network requires three scans to complete the path finding sequence while the TLN and TSLN networks only require two scans. The second scan for the SLN network essentially proceeds in a manner as previously described above wherein the signal ENB is generated for a second time to reactuate one of the relays MD1–MDN at the end of the second scan, to complete the scan. However, there is no transfer of count from the storage counter 134 into the scanner counter 112 since the flip-flop 360 is "set", inhibiting the gate 354 and thereby preventing the enabling of the gates 132. The third scan of the SLN system and the second scan of the TLN and TSLN system are essentially the same. At the start of the last scan, the start signal ST is applied to the gate 328 and an MKE signal for the scanner control is applied to the gate 392 for conditioning the scanner control circuit for the last scan. The start signal ST sets the flip-flop 334, as previously mentioned, conditioning the circuit for a counting sequence, but, however, there is no transfer of the counts from the storage counter 134 into the scanner counter 112 since the flip-flop 360 is still "set", inhibiting the gate 354 and thereby preventing the enabling of gates 132. The flip-flop 334 enables the scanner counter 112 for the next counting sequence by applying an RSC signal to the gates 338 and 340 resetting the scanner counter 112 to a count of zero. The flip-flop 334 also enables the flip-flops 342 and 344 so that the reduced clock pulses CP1 are applied to the scanner counter 112 via gates 324 and 326. The scanner counter 112 now applies counting signals to the decoder 114 via lines SD1 through SD16 and the driver gates 119 are enabled by the signal ENA, as previously described. When a current pulse is detected indicating that a path is found, the signal DT "sets" the found flip-flop 348 via the gate 372, however, the MKE signal transmitted through the gate 392 inhibits the gate 374 (preventing the generation of the EMB signal) and enables a gate 394 via a gate 396 to generate a signal ENC. The ENC signal enables the DT relay gates 128 to actuate a corresponding one of the relays DT1–DTN, which, in turn, enables the marking of the free path located by the path finding sequence, and also removes the signal ST. When the marking is complete, a reset signal RES is applied via the gate 398 (FIG. 6) which resets the flip-flop 360.

The scanning system also includes arrangements for providing a signal in the event no path has been found when scanning during the first scan from the count preset into the scanner counter 112 from the storage counter 134 to a count limit 20 in the scanner counter 112, and also for reentry in the case of the TLN network. The flip-flops 404 and 406 and the reentry flip-flop 400 (FIG. 5) are put in a reset condition at the end of a scanning sequence by the RES signal. If a path has been found during the first scan sequence, the flip-flops 404 and 406 are maintained in a "reset" condition by a signal SC12 applied via a gate 401. When the scanner counter 112 reaches a count of 20 from the preset count during the first scan for the first time, and with both the flip-flops 404 and 406 reset, an enabling signal is applied to a gate circuit 408 via a gate 410 to enable the scanner counter 112 for the next counting cycle. In addition, during the first count of twenty, a gate 412 is enabled to apply a signal via a gate 414 to a gate 416 (while both the flip-flops 404 and 406 are reset) to apply a reset signal via the gates 338 and 340 to reset the scanner counter 112 to a count of zero. The output from the gate 414 also "sets" the flip-flop 404 indicating that the scanner counter 112 has exceeded the count of 20 once. The flip-flop 404, when set, inhibits the gates 416 and 408.

When the scanner counter 112 reaches a second count of 20, all available paths have been scanned during the first scan sequence and no paths are available. At this time, a gate 418 is enabled to produce a no path available NPA signal. The scanner counter 112 is allowed to count through the count of 20 before indicating that no path is available (NPA) so that a complete scan of all available paths is made regardless of the count to which the scanner counter 112 was preset at the start of the first scan. This arrangement allows the scanner system to be preset and function as an allotter arrangement to distribute the traffic through the network and still determines when a scan has been completed and no paths are available. In the case of the SLN or TSLN, the path finding sequence ends and an equipment busy signal is sent to the calling party.

In the event that the scanning system is used for locating a path through the TLN, the output of the gate 418 is connected via the dashed line 419 to "set" the reentry flip-flop 400. The reentry flip-flop, when "set", actuates a relay REQ via a gate 422, which, in turn, sends the signal requesting a reentry path finding cycle. At this time, the ST signal will restart the path finding sequence, and the scanner counter 112 will be reset to zero, as previously mentioned. When the scanner counter 112 reaches the count of twenty, the flip-flop 404 is reset and the flip-flop 406 is set, at which time a gate 424 is enabled to produce a no path available NPA for the TLN system. Since no path is available, and the path finding sequence has been completed, the scanning system is reset by the signal RCS for the next path finding sequence.

What is claimed is:

1. A scanner circuit comprising:

a counter circuit for counting clock pulses applied thereto;

decoder circuit means coupled to said counter circuit for providing sequential scanning pulses;

first circuit means for stopping said counter circuit in response to a current pulse in said decoder circuit in response to a scanning pulse;

a memory circuit;

second circuit means responsive to a control signal for applying a count to said counter circuit corresponding to a count stored in the memory circuit;

third circuit means responsive to a control signal for applying a count to said memory circuit corresponding to a count stored in the counter circuit, and control circuit means enabling said counter circuit to begin a preset number of successive counting cycles in a scanning sequence and applying a control signal to the second circuit means prior to the first counting cycle in the sequence and applying a control signal to the third circuit means after the counter has been stopped by the first circuit means during the first counting cycle.

2. A scanner circuit comprising:

counter circuit means for counting clock pulses applied thereto, to produce sequential scanning pulses;

first circuit means for stopping said counter circuit in response to a signal condition caused by any of said scanning pulses;
control circuit means for enabling said counter circuit means to start a preset number of successive counting cycles in a scanning sequence;
memory circuit means;
second circuit means for applying a count to said counter circuit corresponding to a count stored in said memory circuit means prior to the start of the first counting cycle in the scanning sequence, and
third circuit means for applying a count to said memory circuit means corresponding to a count in said counter circuit means when the counter circuit means has been stopped by said first circuit means during the first counting cycle in the scanning sequence.

3. A scanner circuit as defined in claim 2 wherein:
said counter circuit means includes a decoder circuit having a plurality of output circuits for providing the successive scanning pulses and a continuous output on one of said output circuits when said counter circuit is stopped that corresponds to the count in said counter circuit means.

4. A scanner circuit as defined in claim 3 including:
fourth circuit means for providing an output signal on one of a first plurality of lines corresponding to the count in said counter circuit means when said counter circuit means is stopped at the end of a plurality of counting cycles of said scanning sequence, and
fifth circuit means for providing an output signal on one of a second plurality of lines corresponding to the count in said counter circuit means when said counter circuit means is stopped at the end of at least the last counting cycle of said scanning sequence.

5. A scanner circuit as defined in claim 1 wherein:
said second means includes a latching circuit that enables the transfer of counts from the memory circuit means to said counter circuit means only once during each scanning sequence, and
said third circuit means includes a latching circuit that enables the transfer of counts from the counter circuit means to the memory circuit means only once during each scanning sequence.

6. A scanner circuit as defined in claim 2 including:
circuit means for detecting the number of times said counter circuit means in a counting cycle has reached a preset count and to produce an output signal when said preset count has been reached a predetermined number of times.

7. A scanner circuit as defined in claim 6 wherein:
said detecting circuit means resets the counter circuit means when said preset count is reached.

8. A scanner circuit as defined in claim 7 wherein:
said detecting circuit means produces an output signal when the preset count in the first counting cycle in a scanning sequence is reached a second time.

9. A scanner circuit as defined in claim 8 wherein:
said detecting circuit means produces a second output signal when the preset count in the first counting cycle in a scanning sequence is reached a third time.

10. A scanner circuit comprising:
a counter circuit means for counting clock pulses applied thereto;
a decoder circuit means coupled to said counter circuit means for providing scanning pulses in sequential order on a plurality of output lines when the counter circuit is counting, and when the counter circuit is stopped providing a continuous signal on one of the output lines corresponding to the count at which the counter stopped;
circuit means responsive to be enabled by a first control signal for applying the scanning pulses to a first plurality of output circuits;
circuit means for stopping said counter circuit means in response to a signal condition caused by any of the scanning pulses on the first plurality of output circuits;
circuit means responsive to be enabled by a second control signal for applying signals from said scanner output lines to any one of a second plurality of output circuits;
circuit means responsive to be enabled by a third control signal for applying signals from said scanner output lines to any one of a third plurality of output circuits;
control circuit means coupled to said counter circuit means for enabling said counter circuit means to start a preset number of successive counting cycles in a scanning sequence, and
circuit means for applying said first control signal while said counter circuit means is counting, for applying said second control signal at the end of preset number of successive number of counting cycles in a scanning sequence including the first counting cycle, and for applying said third control signal at the end of at least the last counting cycle in a scanning sequence.

11. a scanner circuit as defined in claim 10 wherein:
each of said three circuit means responsive to the first, second and third control signals include a plurality of gating circuits, one for each of its plurality of output circuits;
said first control signal comprises clock pulses for enabling the gating circuits in the circuit means responsive to the first control signal in synchronism with the counting rate of said counter circuit means, and
said second and third control signals, when applied, are continuous signals.

12. A scanner circuit as defined in claim 10 wherein:
said circuit means for applying said first, second and third control signals applies the second control signal at the end of successive counting cycles and is responsive to a fourth control signal to apply the third control signal at the end of at least one counting cycle subsequent to the receipt of the fourth control signal.

13. A scanner circuit comprising:
counter circuit means for receiving counting pulses to provide sequential scanning pulses;
circuit means for stopping said counter circuit in response to a signal condition caused by any of the scanner pulses, and
control circuit means responsive to input signals for enabling said counter to start a preset number of successive counting cycles in a scanning sequence wherein the first counting cycle of a scanning sequence starts at the count at the end of the first counting cycle in the prior scanning sequence.

14. A scanner circuit as defined in claim 13 wherein said counter circuit means includes:

circuit means for determining when a preset count is reached a first time in a scanning sequence for resetting the counter circuit means and for inhibiting said counter circuit means when the preset count is reached a second time until subsequently enabled by said control circuit means.

15. A scanner circuit as defined in claim 13 wherein said counter circuit means includes:

circuit means for determining when a preset count is reached in a preset number of consecutive counting cycles in a scanning sequence for resetting the counter circuit means in each counting cycle and for inhibiting said counter circuit means when the preset count is reached an additional time until subsequently enabled by said control circuit means.

* * * * *

UNITED STATES PATENT OFFICE
CERTIFICATE OF CORRECTION

PATENT NO. : 3,718,907
DATED : February 27, 1973
INVENTOR(S) : Otto Altenburger

It is certified that error appears in the above-identified patent and that said Letters Patent are hereby corrected as shown below:

| | |
|---|---|
| Col. 4, line 51 | "30a-30" should read ---30a-30n---. |
| Col. 5, line 16 | "32a-32" should read ---32a-32n---. |
| line 37 | "32a-32" should read ---32a-32n---. |
| Col. 9, line 16 | "IS" should read ---is---. |
| Col. 13, line 30 | "When" should start a new paragraph. |
| Col. 16, line 38 | "a" should read ---A---. |

Signed and Sealed this

*twenty-first* Day of *October 1975*

[SEAL]

*Attest:*

RUTH C. MASON
*Attesting Officer*

C. MARSHALL DANN
*Commissioner of Patents and Trademarks*